US012603201B2

(12) United States Patent
Li et al.

(10) Patent No.: US 12,603,201 B2
(45) Date of Patent: Apr. 14, 2026

(54) EXPANDABLE SINTERED NEODYMIUM-IRON-BORON MAGNET, PREPARATION METHOD THEREFOR AND APPLICATION THEREOF

(71) Applicants: YANTAI ZHENGHAI MAGNETIC MATERIAL CO., LTD., Yantai (CN); NANTONG ZHENGHAI MAGNET CO., LTD., Rugao City (CN)

(72) Inventors: Zhiqiang Li, Yantai (CN); Yongjiang Yu, Yantai (CN); Bin Zhou, Yantai (CN); Yunting Su, Yantai (CN); Wen Li, Yantai (CN)

(73) Assignees: YANTAI ZHENGHAI MAGNETIC MATERIAL CO., LTD., Yantai (CN); NANTONG ZHENGHAI MAGNET CO., LTD., Rugao City (CN)

( * ) Notice: Subject to any disclaimer, the term of this patent is extended or adjusted under 35 U.S.C. 154(b) by 0 days.

(21) Appl. No.: 18/568,830

(22) PCT Filed: Jun. 13, 2022

(86) PCT No.: PCT/CN2022/098424
§ 371 (c)(1),
(2) Date: Dec. 10, 2023

(87) PCT Pub. No.: WO2022/258069
PCT Pub. Date: Dec. 15, 2022

(65) Prior Publication Data
US 2024/0274332 A1 Aug. 15, 2024

(30) Foreign Application Priority Data

Jun. 11, 2021 (CN) .......................... 202110657206.1

(51) Int. Cl.
*B22F 3/24* (2006.01)
*C22C 38/00* (2006.01)
(Continued)

(52) U.S. Cl.
CPC .............. *H01F 1/0577* (2013.01); *B22F 3/24* (2013.01); *C22C 38/002* (2013.01);
(Continued)

(58) Field of Classification Search
None
See application file for complete search history.

(56) References Cited

U.S. PATENT DOCUMENTS 4,935,080 A * 6/1990 Hassell .................. H02K 15/03
427/127

FOREIGN PATENT DOCUMENTS

CN 102471659 A 5/2012
CN 104341843 A 2/2015
(Continued)

OTHER PUBLICATIONS

Machine translation via EPO CN 107134362 A (translated Mar. 20, 2025) (Year: 2017).*
(Continued)

*Primary Examiner* — Elizabeth Collister
(74) *Attorney, Agent, or Firm* — NKL Law; Allen Xue

(57) ABSTRACT

An expandable sintered neodymium-iron-boron magnet, a preparation method, and an application are provided. The magnet has a sintered neodymium-iron-boron magnet and an expandable coating coated on the surface of the sintered neodymium-iron-boron magnet. The sintered neodymium-iron-boron magnet coated with the expandable coating is used to replace a conventional assembly method of an epoxy resin adhesive coating magnet and potting resin glue, so that the magnet coated with the expandable coating may be (Continued)

12.9mm x250    200um inserted into a magnetic steel groove. The irreversible expansion of the coating itself is used to fix the magnet in the magnetic steel groove. Meanwhile, the use of the expandable coating shortens the assembly time of motors and improves the assembly accuracy of the motors.

20 Claims, 2 Drawing Sheets

(51) Int. Cl.

| | | |
|---|---|---|
| *H01F 1/057* | (2006.01) | |
| *H01F 41/02* | (2006.01) | |
| *H02K 1/02* | (2006.01) | |
| *H02K 15/03* | (2006.01) | |

(52) U.S. Cl.
CPC ....... *C22C 38/005* (2013.01); *H01F 41/0253* (2013.01); *H02K 1/02* (2013.01); *B22F 2003/242* (2013.01); *B22F 2003/247* (2013.01); *B22F 2003/248* (2013.01); *B22F 2301/355* (2013.01); *B22F 2998/10* (2013.01); *B22F 2999/00* (2013.01); *H02K 15/03* (2013.01)

(56) References Cited

FOREIGN PATENT DOCUMENTS

| CN | 107134362 A | * | 9/2017 | ............. B29C 44/02 |
|---|---|---|---|---|
| CN | 107294321 A | | 10/2017 | |
| CN | 112774959 A | | 5/2021 | |
| CN | 113150366 A | | 7/2021 | |
| CN | 113388306 A | | 9/2021 | |
| CN | 113764150 A | | 12/2021 | |
| DE | 102014214381 A1 | | 1/2016 | |
| EP | 3819922 A1 | | 5/2021 | |
| JP | 6680354 B2 | | 4/2020 | |
| WO | 2014073424 A1 | | 5/2014 | |

OTHER PUBLICATIONS

Machine translation via EPO DE 102014214381 (translated Mar. 20, 2025) (Year: 2014).*

* cited by examiner

EXPANDABLE SINTERED NEODYMIUM-IRON-BORON MAGNET, PREPARATION METHOD THEREFOR AND APPLICATION THEREOF

CROSS-REFERENCE TO RELATED APPLICATIONS

The present application is a U.S. national stage entry of international application No. PCT/CN2022/098424, filed on Jun. 13, 2022, which claims the benefit of priority to the Chinese Patent application Ser. No. 202110657206.1, entitled "EXPANDABLE SINTERED NEODYMIUM-IRON-BORON MAGNET, PREPARATION METHOD THEREFOR AND APPLICATION THEREOF", filed with the China National Intellectual Property Administration on Jun. 11, 2021, the content of each is incorporated herein by reference in its entirety.

TECHNICAL FIELD

The present disclosure relates to the technical field of surface protection of magnetic materials, in particular to an expandable sintered neodymium-iron-boron magnet, a preparation method therefor and use thereof.

BACKGROUND

The sintered neodymium-iron-boron magnet is known as the modern "magnet king" due to excellent remanence, coercivity, and magnetic energy product, and thus is widely applied to the industries of energy, transportation, machinery, medical care, IT, household appliances, and the like. Particularly, the demand and application of the sintered neodymium-iron-boron magnet are expanding along with the development and utilization of new energy. The emergence of the sintered neodymium-iron-boron magnet greatly promotes the development of the permanent magnet motor, so that the sintered neodymium-iron-boron permanent magnet is used to replace the original product equipped with a ferrite or samarium-cobalt magnet as a motor stator or rotor, thereby reducing the weight of the motor, improving the power coefficient, and increasing the output power. However, the sintered neodymium-iron-boron consists of a main phase $Nd_2Fe_{14}B$, an Nd-rich phase, and a B-rich phase, in which the metal Nd element has the strongest chemical activity and is extremely easy to corrode in humid, high-temperature and electrochemical environments, so that the further expansion of the application fields of the sintered neodymium-iron-boron magnet are greatly limited.

At present, an electrophoretic epoxy resin coating is commonly used for surface protection in the motor industry. The coating has a thickness of 15-30 μm, strong binding ability to a substrate, and the outstanding advantages of acid resistance, base resistance, and the like. However, resin adhesive filling is required for assembly in the motor assembly process, that is, inserting a magnetite into a magnetic steel groove, injecting an resin adhesive, and heating and curing the resin adhesive to fix the magnet in the magnetic steel groove. Therefore, in the motor assembly process, the factors such as the flowability, the adhesion, the heat conductivity, the oil resistivity, and the environmental protection property of the resin adhesive need to be considered, and meanwhile, due to the long time of heating and curing of the resin adhesive, it usually takes more than 24 h to perform heating and curing to meet the requirements for the bonding force in motor assembly. In addition, although the epoxy resin bonding coating has excellent performance, the coating has low hardness and extremely poor wear resistance, and is prone to damage in packaging, transportation and motor assembly. Moreover, because the epoxy resin bonding coating is a cathode protection coating, once the coating was damaged, the magnet will suffer serious corrosion. Therefore, how to fix the magnet in the magnetic steel groove and make the coating have relatively high hardness and wear resistance becomes a technical problem to be solved urgently in the field.

SUMMARY

In order to solve the technical problem described above, the present disclosure provides an expandable sintered neodymium-iron-boron magnet, which comprises a sintered neodymium-iron-boron magnet and an expandable coating that coats on the surface of the sintered neodymium-iron-boron magnet.

According to an embodiment of the present disclosure, the expandable coating has a thickness of 50-300 μm, preferably 80-150 μm, illustratively 50 μm, 80 μm, 110 μm, 150 μm, 180 μm, 200 μm, 250 μm, or 300 μm.

According to an embodiment of the present disclosure, the expandable coating softens at 60-100° C., illustratively 60° C., 70° C., 80° C., 90° C., or 100° C.

According to the embodiment of the present disclosure, in a pressure-free state, the expandable coating has a thickness at an expansion rate of 200-400%, preferably 300-400%, illustratively 200%, 220%, 250%, 280%, 300%, 350%, or 400%.

When the expandable coating of the present disclosure is heated at 165-210° C., an organic resin within the expandable coating is cross-linked to achieve fixing molding.

According to an embodiment of the present disclosure, the expandable coating is honeycomb-shaped after expansion. Preferably, the expandable coating has a morphology substantially as shown in FIG. 1 after expansion.

In the present disclosure, the expansion rate=thickness of the coating in a free state after expansion/thickness of the expandable coating before expansion.

According to an embodiment of the present disclosure, the expandable coating comprises at least a water-soluble resin and a foaming agent.

Preferably, the water-soluble resin is selected from at least one of a water-soluble acrylic resin, a water-based epoxy resin, and a water-based polyurethane resin. Preferably, the water-soluble resin is selected from a water-soluble acrylic resin.

According to an embodiment of the present disclosure, the solid content of the water soluble resin in the expandable coating is 30%-50%, illustratively 30%, 35%, 40%, or 50%.

Preferably, the foaming agent is thermoplastic expandable microspheres, and preferably, the thermoplastic expandable microsphere have a diameter of 5-30 μm, preferably 5-20 μm, illustratively 5 μm, 8 μm, 10 μm, 12 μm, 15 μm, 18 μm, 20 μm, 25 μm, or 30 μm.

According to an embodiment of the present disclosure, after expansion of the expandable coating, the area of the expandable microspheres accounts for 60%-90%, illustratively 60%, 70%, 80%, or 90% of the cross-sectional area of the expandable coating.

According to an embodiment of the present disclosure, the expandable microspheres in the expandable coating are expanded in a stepped manner at 110-210° C. (illustratively 110° C., 120° C., 130° C., 140° C., 150° C., or 160° C.).

Preferably, the thermoplastic expandable microspheres have an average diameter of 10-15 μm, illustratively 10 μm, 12 μm, or 15 μm.

Preferably, the thermoplastic expandable microspheres have an expansion temperature of 110-210° C., illustratively 110° C., 120° C., 150° C., 160° C., 170° C., 180° C., or 200° C.

Preferably, the thermoplastic expandable microspheres have a maximum heat-resistant temperature of 145-235° C., illustratively 145° C., 160° C., 180° C., 200° ° C., 215° C., or 235° C.

According to an embodiment of the present disclosure, the expandable coating is prepared by coating with an expandable coating material comprising at least components of a water-soluble resin and a foaming agent.

According to an embodiment of the present disclosure, the water-soluble resin in the expandable coating material has a weight percentage of 45%-65%, e.g., 50%-60%.

According to an embodiment of the present disclosure, the foaming agent in the expandable coating material has a weight percentage of 10%-30%, e.g., 15%-25%.

According to an embodiment of the present disclosure, the expandable coating material further optionally comprises hectorite. For example, the hectorite has a weight percentage of 0.1%-0.5%, e.g., 0.2%-0.4%.

According to an embodiment of the present disclosure, the expandable coating material further optionally comprises diethylene glycol butyl ether. For example, the diethylene glycol butyl ether has a weight percentage of 0.5%-3%, e.g., 0.8%-2.5%.

According to an embodiment of the present disclosure, the expandable coating material further optionally comprises propylene glycol. For example, the propylene glycol has a weight percentage of 1%-3%, e.g., 1.5%-2.5%.

According to an embodiment of the present disclosure, the expandable coating material further optionally comprises an acrylic thickener. For example, the acrylic thickener has a weight percentage of 0.2%-0.8%, e.g., 0.3%-0.6%.

According to an embodiment of the present disclosure, the expandable coating material further optionally comprises a dispersant. For example, the dispersant has a weight percentage of 0.1%-0.5%, e.g., 0.2%-0.4%.

Preferably, the dispersant is ethylene glycol, sodium oleate, carboxylate, or the like.

According to an embodiment of the present disclosure, the expandable coating further optionally comprises a leveling agent. For example, the leveling agent has a weight percentage of 0.1%-0.5%, e.g., 0.2%-0.4%.

Preferably, the leveling agent is silicone oil, organosiloxane, or the like.

According to an embodiment of the present disclosure, the expandable coating material further comprises water.

According to an embodiment of the present disclosure, the sum of the weight percentages of the components in the expandable coating material is 100%.

According to an embodiment of the present disclosure, the preparation method for the expandable coating material comprises mixing the components described above to obtain the expandable coating material.

Preferably, the preparation method for the expandable coating material further comprises dispersing the mixed components in water to obtain a dispersion liquid. Further, the method also comprises stirring the dispersion liquid described above for homogeneous mixing.

In the present disclosure, the expandable microspheres are sieved by a sieving machine to select expandable microspheres with the particle size range of 5-30 μm, which are mixed with a water-soluble resin and stirred for 30-60 min at normal temperature.

According to an embodiment of the present disclosure, the expandable coating is prepared by coating with an expandable coating material comprising the following components in percentage by weight: 45%-65% of water-soluble resin, 10%-30% of foaming agent, 0.1%-0.5% of hectorite, 0.5%-3% of diethylene glycol butyl ether, 1%-3% of propylene glycol, 0.2%-0.8% of acrylic acid thickener, 0.1%-0.5% of dispersant, and 0.1%-0.5% of leveling agent.

The inventors of the present disclosure unexpectedly find that in the heating expansion process, the expansion rate needs to be controlled within the range of 300%-400%. When the expansion rate is less than 200%, the gap between the magnet and the magnetic steel groove cannot be tightly filled; whereas if the expansion rate is more than 400%, the cross-linking inside the coating layer will be disrupted, and the thrust force is insufficient. The expansion rate is related to the content, the particle size, the expansion temperature, the expansion time, the coating thickness, and other conditions of the microspheres in the coating. In the present disclosure, the expansion rate can be controlled within an appropriate range by optimizing the amount and the expansion conditions of starting materials of all the components in the expandable coating, so as to further prepare the sintered neodymium-iron-boron magnet with excellent bonding thrust force.

According to an embodiment of the present disclosure, the sintered neodymium-iron-boron magnet consists of a main phase Nd$_2$Fe$_{14}$B, a Nd-rich phase, and a B-rich phase.

The present disclosure also provides a preparation method for the expandable sintered magnet described above, which comprises coating with the expandable coating material comprising the components described above the surface of the sintered neodymium-iron-boron magnet, and performing pre-curing treatment to prepare the expandable sintered magnet.

According to an embodiment of the present disclosure, the sintered neodymium-iron-boron magnet further comprises a step of performing surface pretreatment before coating the expandable coating material.

According to an embodiment of the present disclosure, the surface pretreatment comprises processes of chemical ultrasonic degreasing, acid washing, and water washing of the surface of the sintered neodymium-iron-boron magnet.

Preferably, the degreasing liquid used in the degreasing process is a composite solution of a base and a surfactant.

Preferably, the base is sodium hydroxide or sodium carbonate at a concentration of 10-20 g/L, illustratively 10 g/L, 15 g/L, or 20 g/L.

Preferably, the surfactant is sodium dodecyl sulfonate or sodium dodecyl sulfate at a concentration of 2-6 g/L, illustratively 2 g/L, 3 g/L, 4 g/L, 5 g/L, or 6 g/L.

Preferably, the degreasing liquid has a temperature of 30-70° C., illustratively 30° ° C., 40° C., 50° C., 60° C., or 70° C. Further, the degreasing is performed for 1-20 min, illustratively 1 min, 5 min, 10 min, 15 min, or 20 min.

Preferably, the acid used for acid washing can be an aqueous nitric acid or citric acid solution.

Preferably, the acid used for acid washing is at a concentration of 5-30 wt %, illustratively 5 wt %, 10 wt %, 15 wt %, 20 wt %, 25 wt %, or 30 wt %. Further, the acid washing is performed for 5-30 s, illustratively 5 s, 10 s, 15 s, 20 s, 25 s, or 30 s.

Preferably, the water washing includes ultrasonic water washing using pure water. Further, the washing is performed for 20-120 s, illustratively 20 s, 30 s, 50 s, 80 s, 100 s, or 120 s.

According to an embodiment of the present disclosure, the coating method includes, but is not limited to, spray coating, printing, dipping, applying, and the like. Preferably, the coating method is spray coating.

According to an embodiment of the present disclosure, the coating has a thickness of 50-300 μm, preferably 80-150 μm, illustratively 50 μm, 80 μm, 110 μm, 150 μm, 180 μm, 200 μm, 250 μm, or 300 μm.

The inventors of the present disclosure unexpectedly find that the expandable coating with too small coating thickness will result in insufficient expansion force in the assembly process, so that the predetermined thrust force requirements cannot be met. However, if the coating thickness of the expandable coating is too large, the surface of the coating is liable to peel off and crack. The coating thickness of the expandable coating is related to the reserved size in the magnetic steel groove, and the larger the reserved size is, the thicker the required coating thickness is. The inventors of the present disclosure unexpectedly find that after the coating expands, the coating exhibits the best effect when the compression rate of expansion of the coating in the magnetic steel groove is 35-65%, and at this time, the bonding force between the magnet and the magnetic steel groove is best, and the magnet has maximum thrust force in the magnetic steel groove.

Compression rate of expansion $m = (H_1 - H_0)/(H_2 - H_0)$;

wherein: $H_0$ is the coating thickness of the expandable coating, $H_1$ is the thickness of the expandable coating after expansion in the magnetic steel groove, and $H_2$ is the thickness of the expandable coating after expansion in the natural state.

According to an embodiment of the present disclosure, the pre-curing treatment involves natural drying of the coating under normal temperature conditions (15-35° C.) or under medium-low temperature (35-90° C.) baking conditions to form a complete coating.

The present disclosure also provides application of the expandable sintered neodymium-iron-boron magnet described above in a motor rotor.

The present disclosure also provides a motor rotor workpiece which comprises the expandable sintered neodymium-iron-boron magnet described above.

The present disclosure also provides an assembly method of the motor rotor workpiece described above, which comprises assembling the expandable sintered neodymium-iron-boron magnet described above into a magnetic steel groove, and performing heating expansion treatment to prepare the motor rotor workpiece.

The inventors of the present disclosure unexpectedly find that the final performance of the expandable coating are related to the expansion temperature, the heating rate, and the holding time in the expansion assembly process, wherein the expansion temperature has a direct effect on the structure of the final expandable coating.

According to an embodiment of the present disclosure, the heating expansion treatment is performed by a two-stage heating method. The first expansion stage has an expansion temperature of 110-160° C., illustratively 110° C., 120° C., 130° C., 140° C., 150° C., or 160° C. Further, the first expansion stage is at a heating rate of 5-15° C./min, illustratively 5° C./min, 10° C./min, or 15° C./min.

When the expansion temperature of the first expansion stage is lower than 110° C., a large number of microspheres will fail to expand and cannot reach the required expansion rate; however, when the expansion temperature of the first expansion stage is higher than 160° C., the microspheres will expand rapidly, but due to different particle sizes of the microspheres in the coating, the microspheres with small particle sizes will expand rapidly and rupture, so that the coating collapses in advance, and thus the corresponding supporting force cannot be obtained. Moreover, when the heating rate of the first expansion stage is controlled to be 5-15° C./min, the expandable coating can be uniformly expanded, and liquefied hydrocarbon gas in the expandable microspheres is fully gasified in the heating process, so that the coating is slowly and uniformly expanded.

According to an embodiment of the present disclosure, the second expansion stage of the heat expansion treatment has an expansion temperature of 180-210° C., illustratively 180° C., 190° C., 200° C., or 210° C. Further, the second expansion stage is at a heating rate of 30-60° C./min, illustratively 30° C./min, 40° C./min, 50° C./min, or 60° C./min. After the coating is uniformly expanded, heating is performed at an accelerated rate, so that the thermoplastic resin in the coating is quickly cured.

The thermoplastic expandable microsphere of the present disclosure comprises a thermoplastic resin shell and a propellant encapsulated therein, wherein more than 70% of the propellant is composed of isooctane. In addition to isooctane, the propellant can be selected from the group consisting of butane, pentane, heptane, and other liquids within an appropriate boiling point range. In the heating expansion process, after the liquid propellant in the expandable microspheres reaches the boiling point, the propellant evaporates to raise the internal pressure of the microspheres to cause the volume change of the propellant, so that the shell which becomes soft after being heated deforms and expands, and softens at the same time, thereby causing the limited expansion of the microspheres. The temperature at which expansion starts is Tstar and the temperature at which the maximum degree of expansion is reached is Tmax. When the temperature exceeds Tmax, the propellant is released through the thermoplastic resin shell to such an extent that the microspheres start to rupture.

In the first expansion stage, the high-boiling-point solvent in the coating volatilizes to dissolve the shell of expandable microspheres with a particle size<10 μm and a wall thickness<3 μm, so that the wall of the shell becomes thinner and the microspheres rupture before the maximum expansion temperature is reached. More than 60% of the microspheres in the expandable coating rupture. After the rupture of the microspheres, the propellant in the microspheres is released. The microspheres do not accelerate to expand any more so as to form a hole structure, and the thermoplastic resin on the outer wall of the microspheres is cross-linked with the water-soluble resin in the coating to form a network structure so as to increase the bonding force of the magnet in the magnetic steel groove.

In the second expansion stage, the expandable microspheres with a particle size>10 μm in the coating continues to expand, but the high-boiling-point solvent in the coating has volatilized and cannot accelerate the rupture of the shells of the expandable microspheres. At this time, the maximum expansion temperature of the second expansion stage is lower than the maximum expansion temperature of microspheres with a particle size>10 μm, and the release of the propellant is slowed down.

The releasing agent in the expandable microspheres consists of more than 70% of isooctane, so that the expansion rate of the coating can be controlled by detecting the release amount of the isooctane in the expansion process, and more than 60% of microspheres in the coating are controlled to rupture, and then the microspheres are cross-linked with the water-soluble resin to form a network structure.

The present disclosure can determine the gas release amount of isooctane in the expansion process by detecting the collected gas, thereby controlling the rupture proportion of the expandable microspheres.

The detection method comprises:

taking a magnet (the specification is 35.5 mm×16.5 mm×5.5 mm) coated with an expandable coating, placing the magnet in a sealed sampling bottle, heating the magnet at the same heating temperature and heating rate as the expansion process conditions in the expansion assembly process, naturally cooling the magnet to 60° C. after heating, purging gas in the sampling bottle into a GC column for detection by using nitrogen, and recording the content $w_1$ of isooctane at this time;

continuously heating the magnet in the sampling bottle at a temperature (240° C.) higher than the maximum expansion temperature $T_{max}$ of the expandable microspheres for 3 h to thoroughly rupture the microspheres in the expandable coating and thoroughly release the isooctane in the microspheres, and recording the content $w_2$ of the isooctane at this time.

The rupture proportion of the microspheres $q=w_1/(w_1+w_2)$ is calculated from the released amount of isooctane.

The inventors unexpectedly find through a large number of experiments that: when the rupture proportion q of the microspheres is within the range of 60-85%, the expandable coating has excellent supporting effect, the expandable magnet has relatively high thrust force in the use environment, and the coating has the best bonding effect.

The expandable coating first undergoes softening process. The expandable microspheres in the coating increase in volume due to heating, and the overall thickness of the expandable coating increases, resulting in extrusion force on the inner wall of the motor tooling. Meanwhile, the hot melt resin in the expandable coating will produce a certain bonding force after softening to fix the sintered magnet in the motor tooling, thus completing the assembly process.

Advantageous Effects of Present Disclosure (1) In the present disclosure, the sintered neodymium-iron-boron magnet coated with the expandable coating is used to replace a conventional assembly method of a magnet with an epoxy resin bonding coating and resin adhesive filling, so that the magnet coated with the expandable coating can be inserted into a magnetic steel groove, and the fixation of the magnet in the magnetic steel groove is achieved by utilizing the irreversible expansion of the coating. Meanwhile, the use of the expandable coating of the present disclosure greatly shortens the assembly time of motors and improves the assembly accuracy of the motors. Moreover, the sintered magnet coated with the expandable coating of the present disclosure has excellent properties such as excellent high temperature resistance, aging resistance, corrosion resistance, and a strong bonding force.

(2) According to the present disclosure, the environment-friendly water-based expandable coating material with a special formula is used to replace the conventional filling resin, thereby reducing the VOC emission and the environmental problems caused by solvent-based binders.

(3) According to the present disclosure, the content of the expandable microspheres in the expandable coating is controlled to be 10%-30%, and after the expandable coating is heated to expand, the water-soluble resin and the expandable microspheres are cross-linked with each other to form a honeycomb-shaped porous structure, wherein the porosity reaches 60%-90%, and the bonding thrust force in the tooling at normal temperature is greater than 1000 N/cm².

(4) The prepared expandable coating has a hardness of above Mitsubishi pencil H at normal temperature (25° C.), and has strong wear resistance, and the surface of the coating is not prone to damage in the transportation process. Moreover, when the expandable coating of the present disclosure is soaked in 10% hydrochloric acid and 10% sodium hydroxide solution for more than 24 h, the coating does not have defects such as softening, dissolving, and peeling off, thus showing high acid and base resistance. Meanwhile, when the coating is soaked in engine oil at 170° C. for more than 500 h, the coating still does not have the problems such as softening, bubbling, and peeling off, thus showing relatively high hot oil resistance.

DETAILED DESCRIPTION

Figure 1:
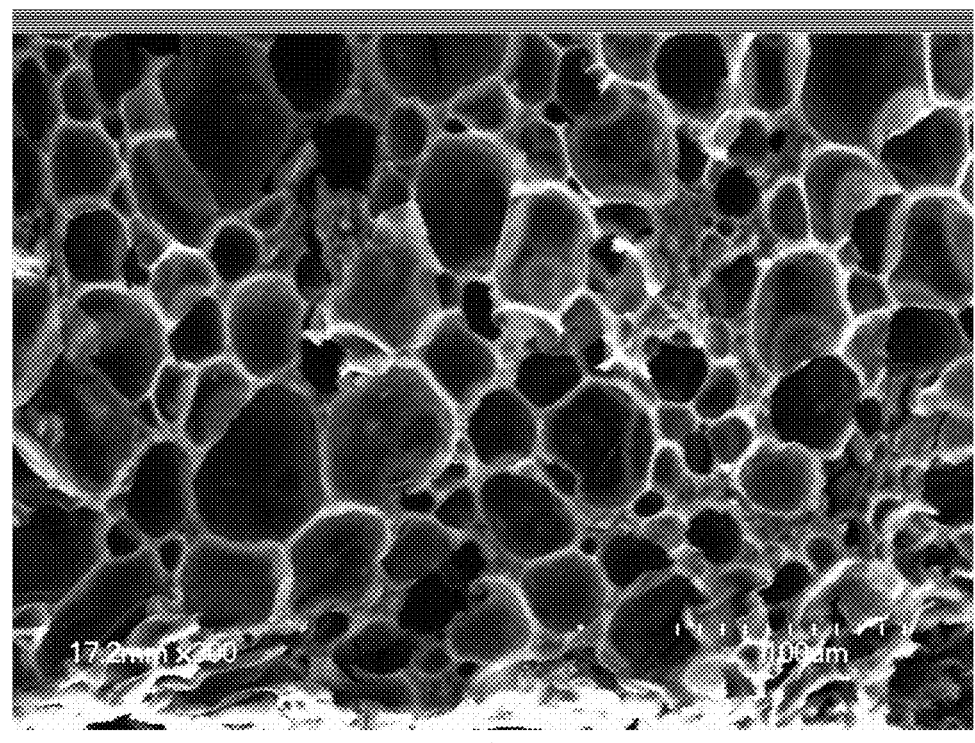
FIG. 1 is an electron micrograph (at a magnification of 300) of the expandable coating prepared in Example 1 after expansion.

The embodiments of the present disclosure will be further illustrated in detail with reference to the following specific examples. It should be understood that the following examples are merely exemplary illustrations and explanations of the present disclosure, and should not be construed as limiting the protection scope of the present disclosure. All techniques implemented based on the content of the present disclosure described above are included within the protection scope of the present disclosure.

Unless otherwise stated, the starting materials and reagents used in the following examples are all commercially available products, or can be prepared using known methods.

Example 1

In this example, a sintered neodymium-iron-boron magnet (not magnetized) with the specification of 35.5 mm×16.5 mm×5.5 mm was used, and a magnetic steel groove with the assembled motor rotor had a size of 36 mm×17 mm×6 mm.

Magnet surface pretreatment: the sintered neodymium-iron-boron magnet was degreased at 60° C. for 2 min by using a composite degreasing liquid with sodium hydroxide at a concentration of 15 g/L and sodium dodecyl sulfonate at a concentration of 3 g/L, and then subjected to acid washing for 15 s by using 25 wt % of an aqueous citric acid solution, and finally placed in deionized water for ultrasonic cleaning for 2 min.

Expandable coating preparation: the expandable coating material was formulated according to the following components (in percentage by weight): 55% of water-soluble acrylic resin, 30% of water, 10% of foaming agent, 0.2% of hectorite, 1.5% of diethylene glycol butyl ether, 2% of propylene glycol, 0.5% of acrylic acid thickener, 0.4% of ethylene glycol, and 0.4% of polydimethylsiloxane, wherein the foaming agent was selected from thermoplastic expandable microspheres with an average particle size of 13 μm.

Coating treatment: the expandable coating material described above was coated on the surface of the magnet by compressed air spray coating, wherein the spray coating speed was 120 mm/s, the coating thickness was 110 μm, the distance between a nozzle and a workpiece was 15 cm, the angle between a spray gun and the workpiece was 25°, and the argon pressure of the spray gun was 0.6 MPa.

Pre-curing treatment: the surface of the magnet coated with the expandable coating material was heated to 50° C., and subjected to a pre-curing treatment to obtain a coating with a thickness of 110 μm.

Coating expansion: the magnet coated with the expandable coating was placed into a high-temperature oven under a non-pressure state, and subjected to two-stage heating, that is, the magnet was first heated to 120° C. and maintained at this temperature for 5 min, and then quickly heated to 170° C. and maintained at this temperature for 3 min. The first heating stage was at a heating rate of 5° C./min, and the second heating stage was at a heating stage of 50° C./min. With the increase of the temperature, the gas pressure within the shell of the expandable microspheres increases. The thermoplastic shell softens, and the expansion volume of the microspheres increases significantly. At this time, the resin within the expandable coating softens, and the thickness of the expandable coating increases with the increase of the volume of the expandable microspheres. As shown in FIG. 1, it can be seen that the microspheres expand uniformly, and the walls of the microspheres and the resin are cross-linked with each other to form a stable supporting structure. The expandable coating consists of a water-soluble acrylic resin and expandable microspheres. The thickness of the expandable coating was increased from 110 μm to 394 μm after the pre-curing treatment, with an expansion rate of 358%. After expansion, the expandable coating is honeycomb-shaped, and the cross-sectional area of the expandable microspheres accounts for 82% of that of the expandable coating. (In the present disclosure, the proportion of the cross-sectional area of the expandable microspheres to the cross-sectional area of the expandable coating in a cross section is calculated as follows: firstly, taking a scanning electron microscope photo of the cross-section of the expandable coating, then identifying gaps in the cross section through the image, calculating the sum of the areas of the gaps, and taking the areas of the gaps as the proportion of the cross section of the expandable microspheres to the cross section of the expandable coating).

The magnet coated with the expandable coating was assembled into a magnetic steel groove of a motor rotor, placed into a high-temperature oven, and subjected to two-stage heating, that is, the magnet was first heated to 120° C. and maintained at this temperature for 5 min, and then quickly heated to 170° C. and maintained at this temperature for 3 min. The first heating stage was at a heating rate of 5° C./min, and the second heating stage was at a heating stage of 50° C./min. (When the magnet is installed in the magnetic steel groove, the expandable coating extrudes the inner wall of the magnetic steel groove after being heated to expand, and the gap between the magnetic steel groove and the magnet is filled, and meanwhile, the resin in the coating is cross-linked with the expandable microspheres to form a honeycomb-shaped coating structure. Due to the limitation of the inner wall of the magnetic steel groove, the coating cannot expand to the maximum in the expansion process, so that the expanded honeycomb-shaped structure is compressed and wrinkled.) After the heating, the motor rotor was cooled under natural conditions. The volume of the expandable microspheres increased due to the change of ambient temperature, and the change was irreversible. Due to the increase in the volume of the coating, the gap between the magnet and the inner wall of the magnetic steel groove was filled, so that the magnet was tightly fixed in the magnetic steel. At this time, the magnet product obtained was named sample 1.

In this state, the normal-temperature bonding thrust force and the high-temperature bonding thrust force of the magnet were determined. The bonding thrust force at room temperature (25° C.) was 1200 N/cm$^2$, and the bonding thrust force at high temperature (170° C.) was 530 N/cm$^2$.

Examples 2-5

The surface pretreatment method, the expandable coating material, and the coating process were the same as those in Example 1. A magnet with an expandable coating with a thickness of 110 μm was inserted into a magnetic steel groove, and different first expansion temperature, second expansion temperature, heating rate, and expansion time were used to obtain the optimal assembly process conditions. The results are shown in Table 1 below.

TABLE 1

| | Name | Sample 1 | Sample 2 | Sample 3 | Sample 4 | Sample 5 |
|---|---|---|---|---|---|---|
| First expansion stage | Expansion temperature/° C. | 120 | 110 | 160 | 110 | 160 |
| | Heating rate ° C./min | 5 | 5 | 15 | 40 | 5 |
| | Holding time min | 5 | 5 | 5 | 5 | 5 |
| Second expansion stage | Expansion temperature/° C. | 170 | 180 | 210 | 180 | 210 |
| | Heating rate ° C./min | 30 | 40 | 60 | 60 | 5 |
| | Holding time min | 3 | 3 | 3 | 3 | 3 |
| Parameter | Normal-temperature thrust force (N/cm$^2$) | 1200 | 1182 | 1192 | 1002 | 1006 |
| | High-temperature thrust force (N/cm$^2$) | 530 | 540 | 535 | 410 | 375 |

TABLE 1-continued

| | Name | Sample 1 | Sample 2 | Sample 3 | Sample 4 | Sample 5 |
|---|---|---|---|---|---|---|
| Rupture | $W_1$ mg/l | 5.66 | 5.81 | 4.15 | 3.8 | 6.41 |
| proportion of | $W_2$ mg/l | 1.24 | 1.08 | 2.74 | 3.08 | 0.58 |
| microspheres | q | 82% | 84% | 60% | 55% | 92% |

*Wherein: $W_1$ and $W_2$ represent the content of isooctane, and q represents the rupture proportion of microspheres.

As can be seen from the results in Table 1, the normal-temperature thrust force and the high-temperature thrust force are correlated with the expansion temperature and the heating rate, and the optimal assembly process conditions can be obtained by optimization.

Meanwhile, the rupture proportion of the microspheres was deduced by determining the release amount of isooctane, and it could be found that when the ruptured microspheres were cross-linked with the resin coating in the case of the rupture proportion in the range of 60%-85%, the obtained coating has a stable structure and can stably support the gap between the magnet and the magnetic steel groove.

FIG. 1 shows the state of the coating after the expansion of sample 1, from which it can be seen that: the microspheres expand uniformly to cross-link with the walls of the microspheres and the resin, thereby forming a stable support structure.

Figure 2:
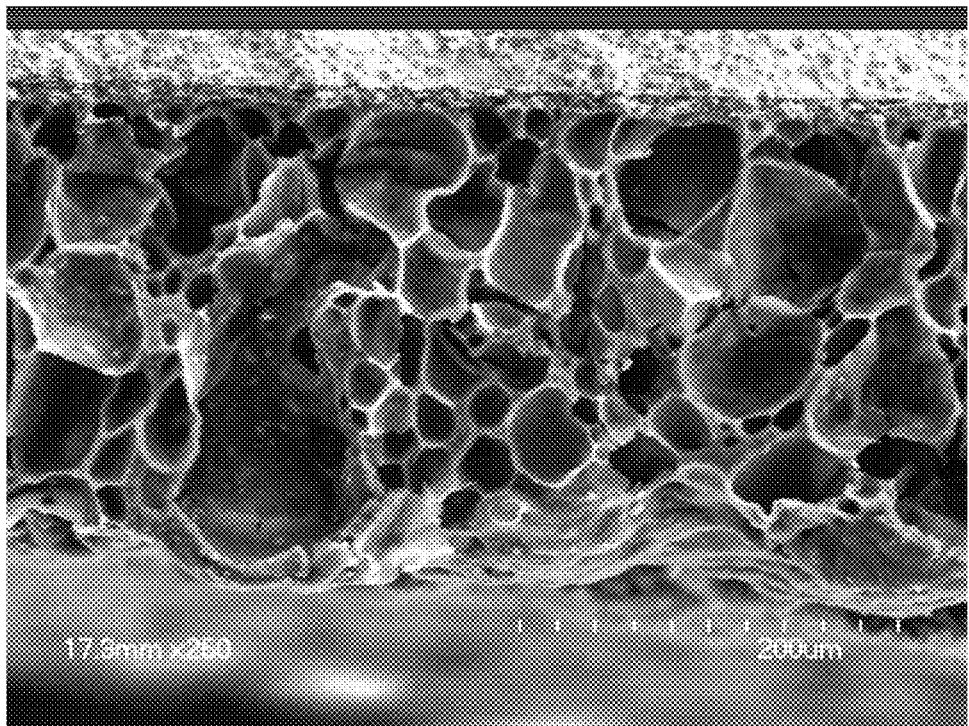
FIG. 2 is an electron micrograph (at a magnification of 250) of the expandable coating (sample 5) prepared in Example 5 after expansion.

FIG. 2 shows the state of the coating after the expansion of sample 5, from which it can be seen that there are many ruptured microspheres, and the microspheres are fused and adhered to each other to form relatively large voids, so that the coating has lower bonding force in a high-temperature state.

Example 6

In this example, a sintered neodymium-iron-boron magnet (not magnetized) with the specification of 35.5 mm×16.5 mm×5.5 mm was used, and a magnetic steel groove with the assembled motor rotor had a size of 36 mm×17 mm×6 mm.

The surface pretreatment method same as that in Example 1 was used. The sintered neodymium-iron-boron magnet was degreased at 60° C. for 2 min by using a composite degreasing liquid with sodium hydroxide at a concentration of 15 g/L and sodium dodecyl sulfonate at a concentration of 3 g/L, and then subjected to acid washing for 15 s by using 25 wt % of an aqueous citric acid solution, and finally placed in deionized water for ultrasonic cleaning for 2 min.

The expandable powder coating material produced by AKZO-Nobel company was selected. The coating consists of 50% of epoxy resin powder, 20% of curing agent, 10% of elastomer resin, and 20% of thermoplastic expandable microspheres. The expandable coating material described above was coated on the surface of the magnet by compressed air spray coating, wherein the spray coating speed was 60 mm/s, the coating thickness was 110 μm, the distance between a nozzle and a workpiece was cm, the angle between a spray gun and the workpiece was 25°, and the argon pressure of the spray gun was 0.6 MPa.

Figure 3:
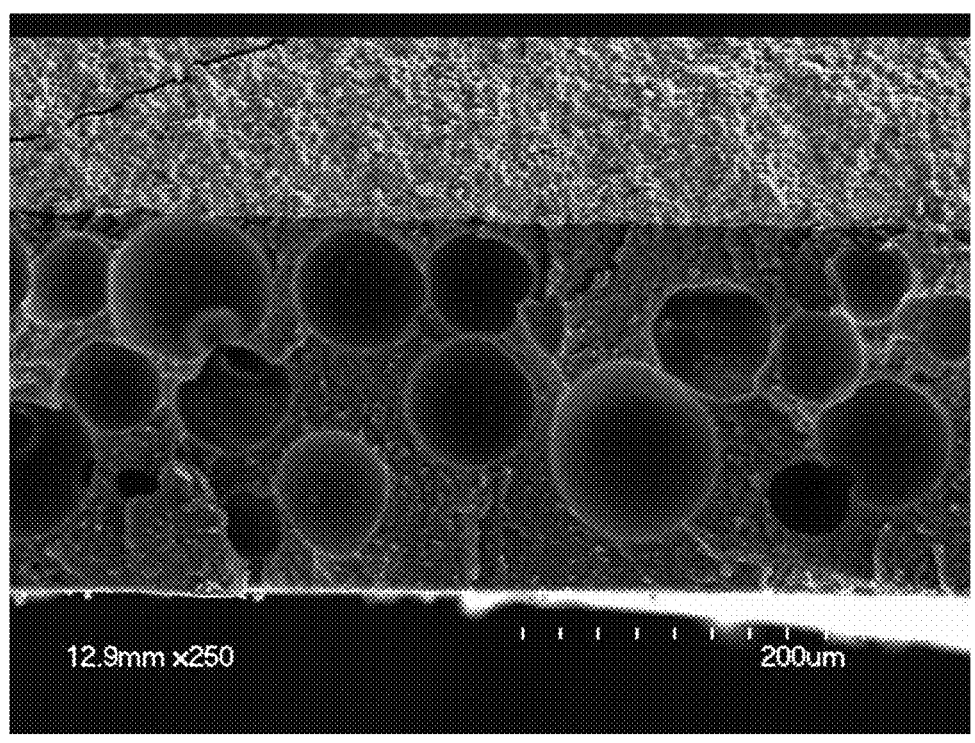
FIG. 3 is an electron micrograph (at a magnification of 250) of the expandable coating (sample 6) prepared in Example 6 after expansion.

The magnet coated with the expandable coating was assembled into a magnetic steel groove of a motor rotor, placed into a high-temperature oven, and heated at 190° C. for 20 min. The volume of the thermoplastic expandable microspheres was increased due to temperature change, resulting in the expansion of the overall coating. At the same time, the epoxy resin was cured, making the coating stable and non-retractable. The cross-sectional structure of the expandable coating was observed using an electron microscope. As shown in FIG. 3, the thickness of the expandable coating was increased from 110 μm to 180 μm after the pre-curing treatment, with the expansion rate reaching 163%. After expansion, the edges of the thermoplastic expandable microspheres can be clearly seen. The expandable microspheres, under heating conditions, increased in microsphere volume solely due to the vaporization of the liquid alkane within the microspheres. Whether the microspheres in the coating are ruptured is speculated by determining the released amount of isooctane in the expandable microspheres. When the coating is heated at 190° C. for 20 min, the released amount w1 of isooctane is determined to be 1.52 mg/L. When the coating is heated to 240° C. and maintained at this temperature for 3 h, the expandable microspheres in the coating are completely ruptured, and the released amount w2 of isooctane is 5.34 mg/L. According to the formula, the rupture proportion of the expandable microspheres in the actual assembly process can be calculated as q=w1/(w1+w2)=1.52/(1.52+5.34)=22%.

As can be seen from FIG. 3, the cross-sectional area of the expandable microspheres accounts for 35% of that of the expandable coating.

In this state, the normal-temperature bonding thrust force and the high-temperature bonding thrust force of the magnet were determined. The normal-temperature (25° C.) bonding thrust force was 920 N/cm², and the high-temperature (170° C.) bonding thrust force was 310 N/cm².

Examples 7-14

In this example, a sintered neodymium-iron-boron magnet (not magnetized) with the specification of 35.5 mm×16.5 mm×5.5 mm was used, and a magnetic steel groove with the assembled motor rotor had a size of 36 mm×17 mm×6 mm.

The surface pretreatment process and expandable coating material same as those in Example 1 were used. The expandable coating described above was coated on the surface of the magnet by compressed air spray coating, wherein the thicknesses for the spray coating were 80 μm, 90 μm, 100 μm, 110 μm, 120 μm, 130 μm, 140 μm, and 150 μm, respectively.

The magnet coated with the expandable coating was assembled into a magnetic steel groove of a motor rotor, placed into a high-temperature oven, and subjected to two-stage heating, that is, the magnet was first heated to 120° C. and maintained at this temperature for 5 min, and then quickly heated to 170° C. and maintained at this temperature for 3 min. The first heating stage was at a heating rate of 5° C./min, and the second heating stage was at a heating stage of 50° C./min. The normal-temperature thrust force and the high-temperature thrust force of the magnet in the operating state were determined. The results are shown in Table 2 below:

$$\text{Expansion rate} = H_2/H_0$$

$$\text{Compression rate} = (H_1 - H_0)/(H_2 - H_0)$$

wherein $H_0$ is the coating thickness, $H_1$ is the thickness of the expandable coating after expansion in the magnetic steel groove, and $H_2$ is the thickness of the expandable coating after expansion in the natural state.

TABLE 2

| No. | Coating thickness H0 | Free expansion thickness H2 | Expansion rate | Expansion thickness H1 in magnetic steel groove | Compression rate | Normal-temperature thrust force | High-temperature thrust force |
|---|---|---|---|---|---|---|---|
| Sample 7 | 80 | 280 | 350% | 250 | 85% | 1100 | 380 |
| Sample 8 | 90 | 318 | 353% | 250 | 70% | 1120 | 385 |
| Sample 9 | 100 | 355 | 355% | 250 | 59% | 1275 | 410 |
| Sample 10 | 110 | 394 | 358% | 250 | 49% | 1310 | 445 |
| Sample 11 | 120 | 434 | 362% | 250 | 41% | 1290 | 480 |
| Sample 12 | 130 | 478 | 368% | 250 | 34% | 1250 | 495 |
| Sample 13 | 140 | 525 | 375% | 250 | 29% | 1105 | 415 |
| Sample 14 | 150 | 585 | 390% | 250 | 23% | 1003 | 400 |

Figure 4:
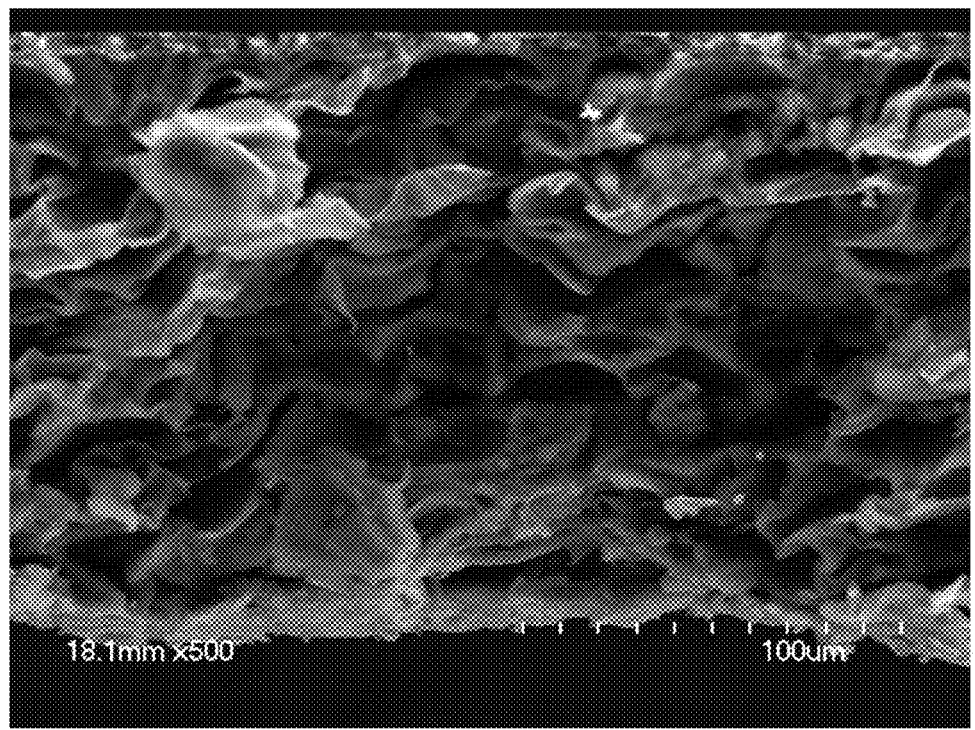
FIG. 4 is an electron micrograph (at a magnification of 500) of the expandable coating (sample 10) prepared in Example 10 after expansion.

FIG. 4 shows the coating state of sample 10 in the magnetic steel groove. As can be seen from FIG. 4, in the expansion process of the coating, the expandable coating is compressed and wrinkled due to the limitation of the inner wall of the magnetic steel groove.

When the expandable coating is seriously compressed, the contact surface of the expandable coating and the contact surface of the inner wall of the magnetic steel groove generate relatively strong stress. The stress on the unit area of the coating is increased, and the internal defects of the coating are exponentially increased, so that the cohesive strength of an adhesive layer is reduced. Therefore, by controlling the compression rate to be above 35%, the magnet with better normal-temperature thrust force and high-temperature thrust force can be prepared.

The greater the compression ratio is, the better the economic effect is obtained. The inventors find through a large number of experiments that: when the compression rate is greater than 65%, the coating is more sensitive to the shrinkage stress and thermal stress caused by temperature change, which will result in the loss of cohesive strength of the magnet, thereby reducing normal-temperature thrust force and high-temperature thrust force of the magnet.

The above examples illustrate the embodiments of the present disclosure. However, the present disclosure is not limited to the embodiments described above. Any modification, equivalent, improvement, and the like made without departing from the spirit and principle of the present disclosure shall fall within the protection scope of the present disclosure.

The invention claimed is:

1. A preparation method for an expandable sintered neodymium-iron-boron magnet, comprising:
coating an expandable coating material on a surface of a sintered neodymium-iron-boron magnet; and
performing a pre-curing treatment to prepare the expandable sintered neodymium-iron-boron magnet, wherein the pre-curing treatment comprises drying the coated sintered neodymium-iron-boron magnet at 15-90° C., wherein:
the expandable coating material comprises the following components in percentage by weight: 45%-65% of a water-soluble resin, 10%-30% of a foaming agent, 0.1%-0.5% of hectorite, 0.5%-3% of diethylene glycol butyl ether, 1%-3% of propylene glycol, 0.2%-0.8% of acrylic acid thickener, 0.1%-0.5% of a dispersant, and 0.1%-0.5% of a leveling agent, the water-soluble resin having a solid content of 30%-50%;
the foaming agent is a plurality of thermoplastic expandable microspheres, each comprising a thermoplastic resin shell and a propellant encapsulated therein, wherein more than 70% of the propellant is one or more selected from isooctane, butane, pentane, and heptane and wherein each of the plurality of thermoplastic expandable microspheres has a diameter of 5-30 μm; and
the expandable coating has a thickness of 50-300 μm, wherein:
in a pressure-free state and when performing a heating expansion treatment at a temperature of 110-210° C., the expandable coating has an expansion rate of 200%-400%,
wherein the heating expansion treatment is performed by a two-stage heating method comprising a first expansion stage followed by a second expansion stage,
wherein the first expansion stage is carried out a heating rate of 5-15° C./min to a temperature of 110-160° C.; and the second expansion stage is carried out a heating rate of 30-60° C./min to a temperature of 180-210° C.,
wherein, after expansion of the expandable coating, the plurality of thermoplastic expandable microspheres account for 60%-90% of a cross-sectional area of the expanded coating.

2. The preparation method according to claim 1, wherein the water-soluble resin is selected from at least one of a water-soluble acrylic resin, a water-based epoxy resin, and a water-based polyurethane resin.

3. The preparation method according to claim 1, wherein each of the plurality of thermoplastic expandable microspheres has an average diameter of 10-15 μm.

4. The preparation method according to claim 1, wherein the water-soluble resin in the expandable coating material has a weight percentage of 50%-60%; and the foaming agent in the expandable coating material has a weight percentage of 15%-25%.

5. The preparation method according to claim 1, wherein the dispersant is ethylene glycol, sodium oleate, or carboxylate; and the leveling agent is silicone oil, or organosiloxane.

6. The preparation method according to claim 1, wherein the sintered neodymium-iron-boron magnet consists of a main phase $Nd_2Fe_{14}B$, a Nd-rich phase, and a B-rich phase.

7. An expandable sintered neodymium-iron-boron magnet obtained by the preparation method according to claim 1.

8. A motor rotor workpiece, comprising the expandable sintered neodymium-iron-boron magnet according to claim 1, wherein the expandable sintered neodymium-iron-boron magnet is assembled into a magnetic steel groove and is subjected to a heating expansion treatment.

9. The preparation method according to claim 1, further comprising a step of performing a surface pretreatment before coating the expandable coating material, wherein the surface pretreatment comprises processes of chemical ultrasonic degreasing, acid washing, and water washing of the surface of the sintered neodymium-iron-boron magnet.

10. The preparation method according to claim 1, wherein the expandable coating has a thickness of 80-150 μm.

11. The preparation method according to claim 1, wherein the expandable coating softens at 60-100° C.

12. The preparation method according to claim 1, wherein the expandable coating has an expansion rate of 300%-400%.

13. The preparation method according to claim 1, wherein the expandable coating is honeycomb-shaped after expansion.

14. The preparation method according to claim 1, wherein the hectorite has a weight percentage of 0.2%-0.4%.

15. The preparation method according to claim 1, wherein the diethylene glycol butyl ether has a weight percentage of 0.8%-2.5%.

16. The preparation method according to claim 1, wherein the propylene glycol has a weight percentage of 1.5%-2.5%.

17. The preparation method according to claim 1, wherein the acrylic thickener has a weight percentage of 0.3%-0.6%.

18. The preparation method according to claim 1, wherein the dispersant has a weight percentage of 0.2%-0.4%.

19. The preparation method according to claim 1, wherein the leveling agent has a weight percentage of 0.2%-0.4%.

20. An assembly method for a motor rotor workpiece, comprising coating an expandable coating material on a surface of a sintered neodymium-iron-boron magnet, wherein:

the expandable coating material comprises the following components in percentage by weight: 45%-65% of a water-soluble resin, 10%-30% of a foaming agent, 0.1%-0.5% of hectorite, 0.5%-3% of diethylene glycol butyl ether, 1%-3% of propylene glycol, 0.2%-0.8% of acrylic acid thickener, 0.1%-0.5% of a dispersant, and 0.1%-0.5% of a leveling agent, the water-soluble resin having a solid content of 30%-50%; and the foaming agent is a plurality of thermoplastic expandable microspheres, each comprising a thermoplastic resin shell and a propellant encapsulated therein, wherein more than 70% of the propellant is one or more selected from isooctane, butane, pentane, and heptane, and wherein each of the plurality of thermoplastic expandable microspheres has a diameter of 5-30 μm;

drying the coated sintered neodymium-iron-boron magnet at 15-90° C. to obtain an expandable sintered neodymium-iron-boron magnet, assembling the expandable sintered neodymium-iron-boron magnet into a magnetic steel groove; and performing heating expansion treatment to prepare the motor rotor workpiece by a two-stage heating method comprising a first expansion stage followed by a second expansion stage, wherein the first expansion stage is carried out a heating rate of 5-15° C./min to a temperature of 110-160° C.; and the second expansion stage is carried out a heating rate of 30-60° C./min to a temperature of 180-210° C.

* * * * *